A. J. HORTON.
CONTROL PANEL.
APPLICATION FILED JUNE 30, 1913.

1,227,790.

Patented May 29, 1917.

Witnesses:
Robert H. Weir
Geo. B. Jones

Inventor
Albert J. Horton
By: Edwin B. H. Tower Jr. Atty.

UNITED STATES PATENT OFFICE.

ALBERT J. HORTON, OF WHITE PLAINS, NEW YORK, ASSIGNOR TO THE CUTLER-HAMMER MFG. CO., OF MILWAUKEE, WISCONSIN, A CORPORATION OF WISCONSIN.

CONTROL-PANEL.

1,227,790.

Specification of Letters Patent.

Patented May 29, 1917.

Application filed June 30, 1913. Serial No. 776,579.

*To all whom it may concern:*

Be it known that I, ALBERT J. HORTON, a citizen of the United States, residing at White Plains, in the county of Westchester and State of New York, have invented new and useful Improvements in Control-Panels, of which the following is a full, clear, concise, and exact description, reference being had to the accompanying drawing, forming a part of this specification.

My invention relates to improvements in control panels.

One object of my invention is to provide an improved panel adapted for use in controlling the charging of storage batteries. Another object is to provide a panel having a rheostat and a circuit breaker which coöperate with each other in such a manner that the circuit to the battery cannot be established by said circuit breaker unless the rheostat has previously been adjusted to the position of maximum resistance in series with said battery. A further object is to provide an improved panel having means permitting the two sections of which the rheostat is composed to be conveniently changed from series to parallel connections, or vice versa, to vary the capacity thereof. An additional object is to provide a panel having a plurality of switches thereon which are actuated separately to close the two sides of the charging circuit, one of said switches having auxiliary means for establishing meter circuits prior to the establishing of said charging circuit. Further advantages will be apparent from the description hereinafter given.

In the accompanying drawings I have illustrated one embodiment of the invention. Other embodiments may be devised, however, and accordingly I do not limit myself to the present disclosure.

Fig. 5 is a circuit diagram showing the circuit connections for a plurality of panel sections.

Figure 1:
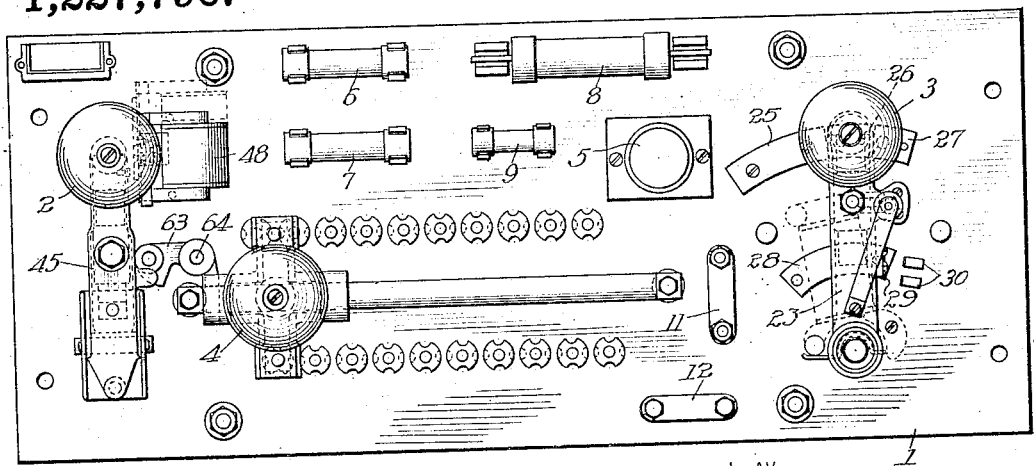
Figure 1 is an elevation of a panel section.
Figure 3:
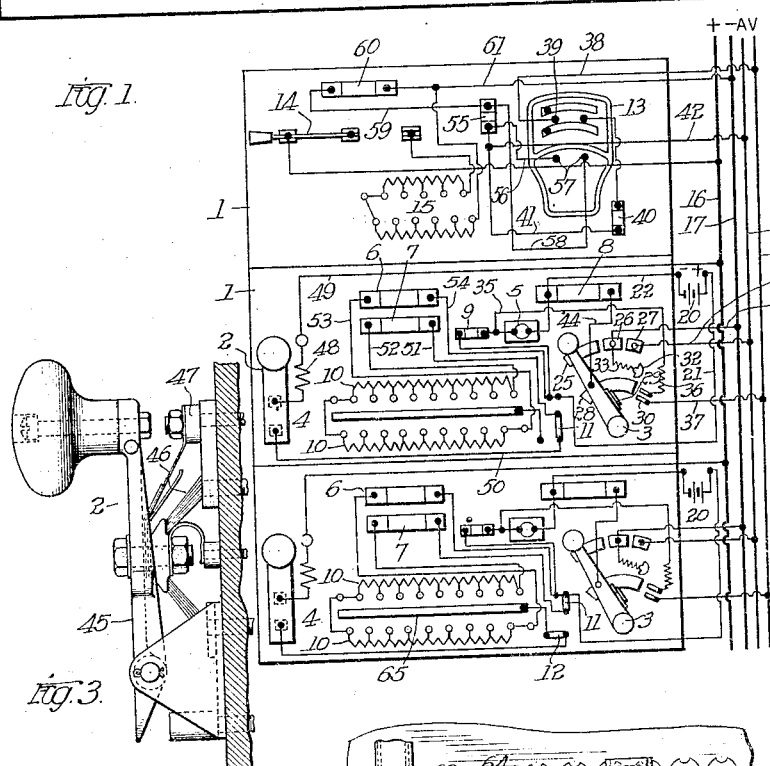
Fig. 3 is a side elevation of a circuit breaker constituting part of said panel section.
Figure 4:
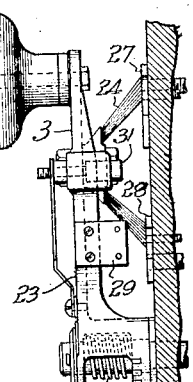
Fig. 4 is a side elevation of a switch also constituting a part thereof.

Each panel section comprises a suitable insulating support 1, having mounted thereon a low current circuit breaker 2, a switch 3, a rheostat head 4, a pilot lamp 5, fuses 6, 7, 8, and 9, resistances 10 carried on the rear side thereof, and conducting links or jumpers 11 and 12.

In order to give a general idea of the operation and function of said panel, it may be stated that it is used preferably in controlling the charging of a storage battery, said panel being connected to suitable charging mains, so that whenever the battery, for example the battery of an electric vehicle, is connected to said panel, the pilot lamp 5 lights, thereby indicating to which panel said battery has been connected. The operator then moves the switch 3 to extreme right hand position, or instrument reading position, and thereupon reads the battery voltage. The deflection of the needle of the instrument indicates also whether or not the battery has been properly connected to the panel. Assuming that the connections are properly made, the operator now closes the low current circuit breaker 2, thereby connecting the battery to the mains, the circuit breaker and the switch each being connected in and controlling one side of the battery circuit. At the time the battery circuit is established, the rheostat head is in the position shown in Fig. 1, thereby insuring a maximum resistance between the battery and the charging line. This condition is assured by virtue of certain interlocking connections hereinafter described, between the rheostat head and said circuit breaker, whereby the latter cannot be moved to close the circuit unless the rheostat head is in extreme left hand position. With the circuit closed as indicated, both the voltage of the battery and the current supplied thereto may be read by the operator who thereupon moves the rheostat head to the right, cutting out the resistance and increasing the charging current until the desired amperage is obtained as indicated on the ammeter. The switch 3 is then released and is restored by a spring to its intermediate or closed position, thereby disconnecting the instruments but allowing the battery charging to continue. During the charging of the battery, the operator may readily determine the battery voltage and the current supplied thereto at any time, by moving the switch 3 to the right hand or reading position, this operation in no way disturbing the battery circuit connections.

Before proceeding to a more detailed description of the various elements constituting a panel section, I will describe the general circuit connections as an aid in understanding the various functions performed. Said circuit connections are shown in Fig. 5, in which a panel is shown made up of three panel sections, the top section being the instrument section or meter section, and the two lower sections illustrating diagrammatically panel sections similar to those disclosed in Fig. 1; the circuit connections in the lower panel section being slightly different from those in the middle panel section, due to the changes effected by the jumpers 11 and 12. The meter section comprises a suitable insulating support 1 having a duplex instrument 13 mounted thereon, the latter being a combined ammeter and voltmeter. Said panel has also mounted thereon a switch 14 and a rheostat 15, the purpose of which is hereinafter described. The charging mains are indicated by references 16 and 17. The conductors 18 and 19 may be termed the ammeter and voltmeter conductors respectively, said conductors, together with the conductors 16 and 17, being customarily mounted at the rear of the panel in the form of bus-bars which are common to all of the panel sections and from which branch connections may lead to any of the individual panel sections.

Assume that it is desired to charge a battery 20, which has been connected to the middle panel section, for example. Such connection causes the lighting of the pilot lamp 5, the connection extending from the positive terminal of the battery, through conductor 21, fuse 9, lamp 5 and conductor 22, to the negative terminal thereof. The operator is thereby advised of the particular panel section (of which there may be a large number) to which the battery has been plugged in, and thereupon moves the switch to extreme right hand position, closing the circuit from the battery to the voltmeter. Said switch comprises a pivotally mounted arm 23, carrying bridging contacts 24, which bridge the upper set of contacts 25, 26, 27, and the lower contact 28. Said arm also carries a bridging member 29 which bridges contacts 30, the latter constituting the voltmeter circuit contacts. Said arm also carries an auxiliary contact 31, which engages a stationary contact 32 in the form of a roller, thereby closing a circuit through a blow-out coil 33 and eliminating arcing at the main contacts. A spring 34 normally tends to return the arm 23 to intermediate or closed position, when moved to meter reading position.

The voltmeter circuit having been closed as previously described, said circuit may be traced from the positive battery terminal through conductor 21, fuse 9, conductor 35, resistance 36, switch contacts 29 and 30, conductors 37 19 and 38, to the voltmeter terminals 39, and returning through fuse 40, conductor 41, conductor 42, to the negative lead 18 and thence through conductor 43 to the switch contact 27 switch arm 23, conductor 44, fuse 8 and conductor 22, to the negative terminal of the battery.

The operator now closes the circuit breaker 2. Said circuit breaker comprises a pivoted arm 45 carrying laminating contacts 46 and an auxiliary arcing contact 47, and is also provided with a low current magnet release 48, whereby it is held in closed position, but is released if the line voltage should ever fall sufficiently low to permit the battery to discharge back into the line.

With the circuit breaker closed, the battery is now connected to the charging mains through the ammeter, the voltmeter connections remaining the same as those previously described. Current now flows from the positive main 16, through conductor 49, holding coil 48, through the main contacts to the circuit breaker 2, through conductor 50, through link 11, conductor 51, fuse 7, conductor 52 to the resistances 10 which are connected in series, conductor 53, fuse 6, conductor 54, conductor 21 to the positive side of the battery. From the negative side of the battery through conductor 22 to fuse 8, at which point the voltmeter circuit branches off, as previously described, the battery charging circuit extending through said fuse and conductor 44, the main contacts 24 and 27 of switch 3 and conductor 43 to the ammeter conductor 18, and through conductor 42, around shunt 55, through conductor 56 to the ammeter terminals 57; returning through conductors 58, 59, through fuse 60, conductor 61, to negative terminal 17.

As the operator moves the rheostat head to the right a portion of the resistance 10 is cut out of the charging circuit, the operator adjusting the rheostat until the desired current is being supplied to the battery, as indicated by the ammeter. Having made this adjustment, the operator may now release the switch 3 which is thereupon returned to intermediate or closed position, the circuit now being the same as previously described except that the return circuit from the battery is completed through the main contacts 24, 26 of said switch and thence through conductor 62 directly to the negative main, instead of including the ammeter in the circuit.

It will be seen that with the connections described, a single meter section will suffice for any desired number of charging panel sections. It is not desirable to have the operator attempt to establish meter circuits from two or more panel sections simultaneously, however, as such a procedure would result in connecting two batteries in series with each other, whereupon, if the voltage of one were considerably higher than the other, one would discharge through the other and the resulting short circuit would blow the fuses, which would thereupon have to be replaced. It is in order to prevent such an occurrence, however, that the resistances 36 are provided in the voltmeter circuit for each individual panel section, said resistances serving to prevent the blowing of fuses under circumstances such as just described.

The circuit breaker 2 cannot be closed unless the rheostat head is in extreme left hand position, for the reason that a bell crank lever 63 is provided which is pivotally mounted at the point 64. (see Figs. 1 and 2) said bell crank lever being weighted so that it normally assumes the position shown in Fig. 2. In this position it obstructs the closing of the circuit breaker, but if said bell crank lever is moved to the position shown in Fig. 1, the obstruction is removed. This movement of the bell crank lever is effected whenever the rheostat head 4 is moved to the extreme left hand position, said rheostat head abutting against one arm of said lever, as clearly shown in Fig. 1, thereby holding it in the desired position.

Figure 2:
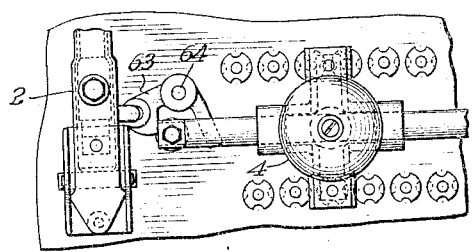
Fig. 2 is an elevation of a detail thereof showing the coöperation of certain parts.

In the lowest panel section shown in Fig. 5, the jumpers 11 and 12 are connected in the manner shown in Fig. 1, thereby permitting a parallel connection of the two sets of resistances 10 which make up the rheostat. In view of the preceding description, the circuit connections may be readily traced, said connections being substantially the same as in the middle panel section except that current, after passing through the circuit breaker 2, divides when it reaches said rheostat, flowing from the rod 65 through the two resistances in parallel and thence through the two fuses 6 and 7, being reunited again at the jumper 11. With this arrangement the capacity of the panel section may be varied considerably, permitting a battery of much larger capacity to be charged than with the usual series connection. Furthermore, the change from series to parallel connection and vice versa, may be very readily effected simply by changing the jumpers 11 and 12 as indicated.

The function of the switch 14 and the resistance 15 on the meter section is to permit a battery to discharge through said resistance when the switch is thrown to the opposite position from that in which it is shown. This is a desirable arrangement where it is necessary to alternately charge and discharge a battery several times where it has become sulfated, or where for other reasons it is desired to treat it in this manner.

It is to be understood, as previously stated, that the invention is not to be limited to the details of construction described and illustrated, or to the details of the circuit connections, except where limitations are found in the appended claims. Accordingly I desire to cover in said claims whatever suitable equivalent means may be devised which fall within the scope of the invention.

What I claim as new and desire to secure by Letters Patent of the United States is:—

1. Battery charging means including a charging circuit, separate switches for opposite sides of said circuit, one of said switches being biased to open position and provided with means under the control of the other of said switches to releasably retain it in closed position, a regulating rheostat for said circuit and interlocking means between said rheostat and said biased switch to insure a given condition of the former upon closure of the latter.

2. Battery charging means including a charging circuit, a switch in one side of said circuit biased to open position, a magnet in said circuit for holding said switch in closed position, a switch in the opposite side of said circuit controlling said magnet to effect release of said former switch, a rheostat in said charging circuit and means interlocking said rheostat and said first mentioned switch to insure a given condition of the former as a pre-requisite to closure of the latter.

3. Battery charging means including a charging circuit, a meter circuit and a common control switch therefor, said switch having a centered position for completion of said charging circuit and being movable in one direction from said position to complete said meter circuit and in a reverse direction from said position to interrupt both said charging circuit and said meter circuit.

4. In combination, a pair of switches, each adapted to close one side of a circuit, one of said switches having auxiliary voltmeter contacts whereby the circuit conditions may be tested with said switch prior to the closing of the other switch, said first switch having also a magnetic blowout.

5. Battery charging means including a charging circuit, a meter circuit, a common control switch for one side of said charging circuit and for said meter circuit, said switch having a closed position with respect to said charging circuit and being movable therefrom to selectively close said meter circuit or open both of said circuits, a second switch for the other of said charging circuits, said second switch being biased to open position, a magnet under the control of said first switch to retain said second switch closed subject to release upon opening of said first switch, a rheostat in said charging circuit and means interlocking said rheostat and said second switch to prevent closure of the latter except under given conditions of the former.

6. A battery charging panel having battery terminal connections thereon, means for visually indicating when a battery has been connected thereto, a pair of switches adapted to establish circuit connections between said battery and suitable charging mains, and a rheostat for regulating the charging current.

7. A battery charging panel comprising an insulating base, an incandescent lamp thereon, battery terminal connections, said lamp being connected thereto, whereby an indication is given of the connecting of a battery to said terminals, a switch for closing one side of the circuit from suitable charging mains to said battery, auxiliary voltmeter contacts controlled by said switch for permitting the battery voltage to be indicated, a low current circuit breaker which may be closed after determining the voltage of said battery, and magnetic means energized by the closing of said circuit for holding said circuit breaker in closed position.

8. A battery charging panel comprising an insulating base, an incandescent lamp thereon, battery terminal connections, said lamp being connected thereto, whereby an indication is given of the connecting of a battery to said terminals, a switch for closing one side of the circuit from suitable charging mains to said battery, auxiliary voltmeter contacts controlled by said switch whereby the battery voltage may be indicated, a low current circuit breaker which may be closed after determining the voltage of said battery, magnetic means energized by the closing of said circuit for holding said circuit breaker in closed position, and a manually adjustable rheostat for regulating the battery charging current, said rheostat coöperating with said circuit breaker, whereby the latter cannot be moved to closed position unless said rheostat is adjusted to insert maximum resistance in series with the battery.

9. The combination with charging mains of a storage battery connected thereto, and a switch on each side of the charging line for opening and closing the charging circuit, one of said switches having auxiliary meter contacts, whereby the circuits to a voltmeter and ammeter may be established without opening the charging circuit.

In witness whereof, I have hereunto subscribed my name in the presence of two witnesses.

ALBERT J. HORTON.

Witnesses:
W. L. CULLY,
J. C. VALENTINE.

Copies of this patent may be obtained for five cents each, by addressing the "Commissioner of Patents, Washington, D. C."